E. W. HECK.
MEAT TENDERER.
APPLICATION FILED NOV. 16, 1914.
1,166,681.
Patented Jan. 4, 1916.
Fig. 1.
Fig. 2.
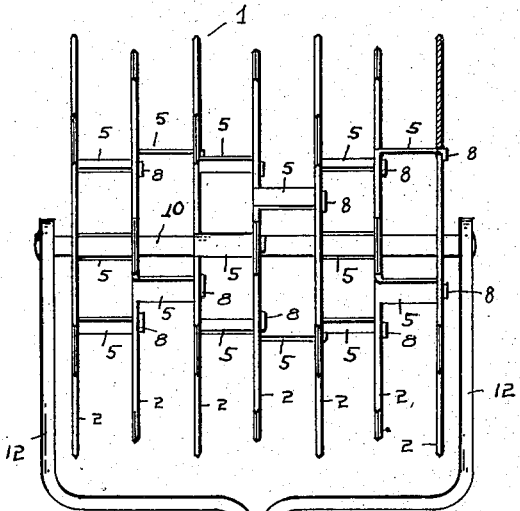
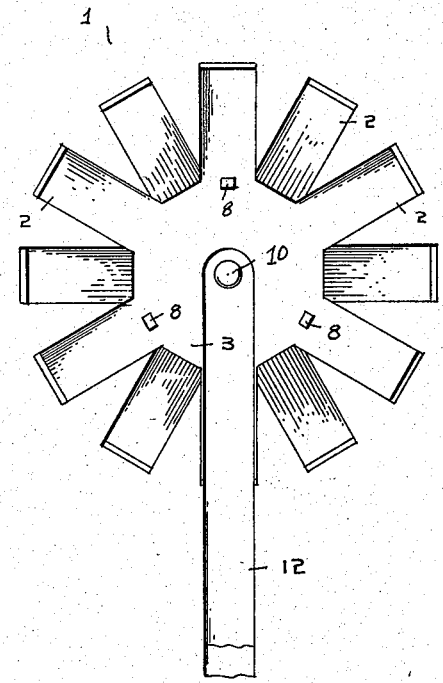
Fig. 3.
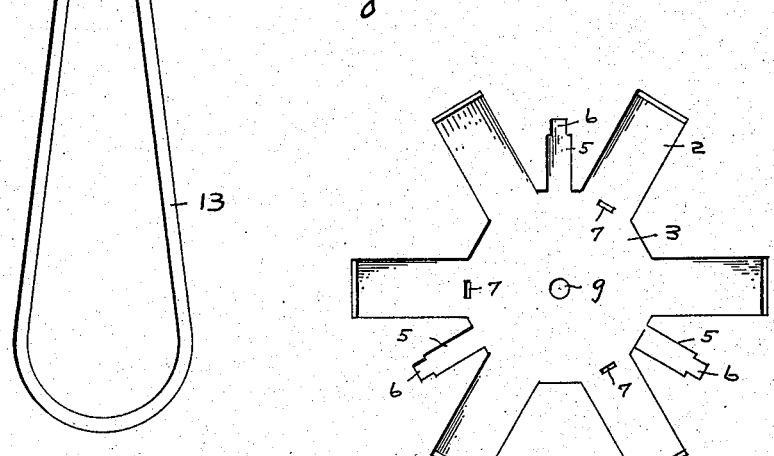
Witnesses
N. R. Bewley
Johanna Weiher
Inventor
Edward W. Heck
By Herman H. Martin
Attorney

UNITED STATES PATENT OFFICE.

EDWARD W. HECK, OF TOLEDO, OHIO.

MEAT-TENDERER.

1,166,681.        Specification of Letters Patent.        Patented Jan. 4, 1916.

Application filed November 16, 1914. Serial No. 872,396.

*To all whom it may concern:*

Be it known that I, EDWARD W. HECK, a citizen of the United States, residing at Toledo, in the county of Lucas and State of Ohio, have invented a new and useful Meat-Tenderer, of which the following is the specification.

My invention relates to a meat-tenderer and has for its object to provide an implement of the kind adapted to render tough and cheaper kind of steak tender, without mincing the meat of the steak or breaking its fiber as by pounding, or necessitating removal of bones.

The objects of my invention are accomplished as hereinafter described and illustrated in the drawings in which—

Figure 1 is a side elevation of my meat tenderer. Fig. 2 is a side elevation of the same and Fig. 3 is a plan view of a cutter disk.

My meat-tenderer comprises a rotor 1 having a plurality of cutters 2 so spaced that by rolling of said rotor incisions or cuts may be produced in a steak. The cutters are formed upon disks 3 which latter are so spaced that the cutters of a disk are opposite the gaps between cutters of a disk disposed adjacent thereto.

The disks are separated and spaced by means of arms 5 which are integral with the body of the disks. The respective arms of a disk are bent at a right angle to the disk body and are each provided with an end shoulder tip 6 adapted to enter slot 7 of a respectively adjacent disk in which position the projecting end 8 of the shoulder tip is so clenched as to compress the body of the respective disk between the shoulders and the clenched ends 8. In order to space the cutters as described and shown in the drawings, the slot 7 of each disk are disposed centrally in the body of a cutter bar adjacent to the respective spacing arms and to the same side thereof. Each disk is also provided with a central aperture 9.

The rotor is fitted up to any number of disks and then mounted upon an arbor 10 the ends of which are riveted to the respective sides of a bail 12, said bail terminating in a handle 13.

In use, my meat-tenderer is drawn or pushed over the surface of a steak and by exerting slight pressure upon the handle, the rolling motion of the gang cutter produces cuts or incisions in the meat without bruising or breaking its fiber. The steak remains undisturbed until one surface is covered with the desired number of incisions, bones in the steak being readily dodged and thicker portions of the steak covered with more incisions. When one side of the steak is so treated, said steak is turned to expose its opposite side for like treatment with my tenderer.

The effect of thus treating steaks is to soften tougher meat, permitting hot air and butter to penetrate the various cuts, thereby causing it to cook quickly and evenly, retaining its original juices and flavor.

What I claim is—

A meat-tenderer, a rotor comprising a plurality of spacer disks, each being provided with radial cutter-bars and integral arms adapted to axially space and so couple to a successive disk, that the cutter-bars of the successive disk are disposed opposite the gap between the bars of the coupling disk and an end disk coupled to the last of the spacer disks, being provided with radial cutter-bars, and a bail provided with a handle and a shaft for rotatable mounting of the rotor.

In witness whereof, I have hereunto set my hand and affixed my seal this 17 day of Aug. 1914.

EDWARD W. HECK. [L.S.]

Witnesses:
    HERMAN H. MARTIN,
    N. S. BRACKNEY.

Copies of this patent may be obtained for five cents each, by addressing the "Commissioner of Patents, Washington, D. C."